United States Patent [19]
Brodie et al.

[11] Patent Number: 5,935,196
[45] Date of Patent: Aug. 10, 1999

[54] TECHNIQUE FOR THE USE OF GPS FOR HIGH ORBITING SATELLITES

[75] Inventors: Peter M. Brodie, Oakland; Laurence J. Doyle, Hazlet, both of N.J.

[73] Assignee: ITT Manufacturing Enterprises, Wilmington, Del.

[21] Appl. No.: 08/873,077

[22] Filed: Jun. 11, 1997

[51] Int. Cl.⁶ .................................................. G01S 5/02
[52] U.S. Cl. .................... 701/226; 701/213; 701/13; 244/158 R; 342/357
[58] Field of Search .............................. 701/13, 213, 226; 342/357; 244/158 R; 455/12.1, 13.2

[56] References Cited

U.S. PATENT DOCUMENTS

| | | | |
|---|---|---|---|
| 5,267,167 | 11/1993 | Glickman | 364/459 |
| 5,490,076 | 2/1996 | Rawicz et al. | 364/459 |
| 5,506,781 | 4/1996 | Cummiskey et al. | 364/459 |
| 5,528,502 | 6/1996 | Wertz | 364/459 |
| 5,717,404 | 2/1998 | Malla | 342/357 |

*Primary Examiner*—Michael Zanelli
*Attorney, Agent, or Firm*—Arthur L. Plevy

[57] ABSTRACT

The present invention is directed toward a navigation system and method for a high orbit spacecraft, which passively utilizes UHF signals carrying intersatellite ranging data transmitted by a constellation of satellites that travel in lower orbits around a celestial sphere. The navigation system enables the high orbit spacecraft to self locate its position relative to an earth centered coordinate frame and comprises a receiver for receiving the UHF signals carrying the intersatellite ranging data and a Kalman or optimum filter coupled to the receiver for processing the ranging data received by the receiver and generating and updating spacecraft position data.

20 Claims, 5 Drawing Sheets

TECHNIQUE FOR THE USE OF GPS FOR HIGH ORBITING SATELLITES

FIELD OF THE INVENTION

The present invention relates to spacecraft navigation and more particularly to a navigation technique and system for high orbiting satellites, which passively employs UHF signals transmitted between a constellation of satellites for intersatellite ranging.

BACKGROUND OF THE INVENTION

Global Positioning Satellite (GPS) navigation as exemplified by NAVSTAR/GPS, is an accurate, three-dimensional navigation system which has become one of the most important technologies of the era, impacting a myriad of users from aircraft and ships, to farmers and hikers. The GPS comprises a constellation of twenty four satellites which orbit the earth twice a day. The orbits of the GPS satellites are maintained in a virtually circular manner at approximately 10,898 nautical miles above the earth, the GPS satellites orbiting the earth in six overlapping orbital planes based on the equatorial plane of the earth. These orbits are chosen so that the GPS system can provide information to users regardless of the time that the user requests information and regardless of the user's position on the earth's surface. This information contains a navigation message, which includes satellite ephemerides and satellite clock drift information.

In order for the system to operate properly, the orbits of the GPS satellites are maintained by a plurality of ground-based tracking stations. The ground-based tracking stations each use a standard GPS L-band transmitter/receiver to monitor and control the orbits of the GPS satellites. Each GPS satellite continuously broadcasts pseudo-random codes at L-band frequencies, L1 at 1575.42 MHZ and L2 at 1227.6 MHZ. One of these signals is referred to as C/A code, which is a signal that can be received by civilian type GPS receivers. The other signal is referred to as P code, which is a signal that can be received only by military type GPS receivers. The ground stations on the earth receive these L-band transmissions from the satellites. These transmissions are analyzed and GPS time is compared with universal standard time at the ground stations. Corrections are transmitted to receivers in each of the satellites from the ground stations.

A major benefit of the GPS is that the number of users is unlimited because the signals transmitted by the satellites are passively acquired. Thus, broad civilian and commercial applications are possible. For example, GPS navigation has been commonly applied in terrestrial (earth) based applications. In such applications, a GPS receiver can be located in mobile units such as ground vehicles to enable the vehicle operator to precisely locate his or her global position. GPS navigation has also been proven to be of value for aircraft and spacecraft use as well, with such "non-terrestrial" mobile units employing a GPS receiver for precisely locating the unit's global position.

The user's GPS receiver operates by engaging in a radio-ranging calculation which involves acquiring the encoded signals transmitted by each GPS satellite and making pseudorange measurements. These measurements are processed in real time to provide the best estimate of the user's position (latitude, longitude, and altitude), velocity, and system time. The user's receiver maintains a time reference which is used to generate a replica of the code transmitted by the satellite. The amount of time that the receiver must apply to correlate the replicated code with the satellite clock referenced code received from the satellite provides a measure of the signal propagation time between the satellite and the receiver. This time propagation or "pseudorange" measurement is the error by the amount of time synchronization error between the satellite and receiver clocks.

The user's receiver then, employs a three dimensional equivalent of the traditional "triangulation" technique on the data it receives from the GPS satellites to compute the user's position. In order to use this "triangular" technique, four of the orbiting GPS satellites must be "visible" to the user at any one time, and the position of these four satellites relative to the earth must be known.

As mentioned above, GPS navigation has been proven to be of value for spacecrafts such as communication satellites and the like. Traditionally, however, such satellites are located and positioned by multiple tracking stations located on the ground. A ground tracking station's fixed position relative to the earth makes it possible to accurately compute the position of an orbiting satellite relative to the tracking station. This is particularly important in satellite systems that cannot function properly without knowledge of satellite position relative to the earth's surface. Typical of such a system would be any communication network that proposes to provide global point-to-point coverage through the use of earth-orbiting satellites. In order for such a system to be operable, it must be capable of determining if the satellite selected to relay the communication is "visible" to both points on the earth, or if a satellite-to-satellite relay is required because the source and the destination are not visible from the same satellite. The visibility of the satellite to any point on the earth is a function of the position of the point, the position of the satellite, and the beamwidth of the satellite's antenna. Since the position of a point on the earth's surface and the beamwidth of the satellite's antenna are known, the only remaining unknown necessary to a visibility determination is the satellite position. The ground station provides a way to determine this satellite position.

For high orbit satellites, this method of satellite positioning is geometrically limited in the horizontal direction. Even with a long baseline between ground stations, location accuracy is typically 20–30 meters, RSS. GPS navigation, on the other hand, holds the promise for a low cost, and autonomous solution for high orbit spacecraft location with a minimum of a three times accuracy improvement. However, for spacecraft such as satellites, that are at orbits higher than the GPS satellites, the GPS L-band signal becomes unreliable at best. The cause of the problem is a lack of L-band signal visibility at these higher orbits. Referring to FIG. 1, it can be seen that only one or two GPS satellites are typically visible by a satellite or spacecraft at high orbit. As mentioned earlier, minimum of four are required for orbit determination.

Recently, however, a newer generation of GPS satellites referred to as GPS block IIR satellites have been provided with an autonomous navigation capability referred to as "AUTONAV", which enables the GPS satellite's position to be predicted up to 210 days instead of 14 days. The AUTONAV system was developed to reduce the GPS satellites' reliance on ground stations for navigation. The AUTONAV system employs a special transponder unit in each GPS Block IIR satellite which is designed to transmit ultra-high-frequency (UHF) signals between the GPS satellites for the purpose of intersatellite ranging. Unlike the L-band signals which are directed at the earth, UHF signals are visible to high orbit satellites and spacecraft. In FIG. 2, a graphical plot of visibility vs. time is shown which indicates that typically, eight to ten GPS satellites would be visible to satellites at geostationary orbit (a minimum of four is required). Geostationary orbits would be one of the more likely places for "high orbit" satellites. While this intersatellite data was not intended for use beyond the GPS constellation, clearly the UHF signals are visible at Geostationary orbits. Additionally, a radio frequency link analysis indicates a 7.1 dB typical signal margin for this case.

Accordingly, it is an object of the present invention, to provide a totally passive navigation technique and system for high orbit spacecraft such as satellites, which operates on UHF based Time intersatellite data transmitted between the GPS block IIR satellites.

SUMMARY

Besides operating at a UHF frequency instead of an L Band frequency, there are significant differences between the navigation receiver concept of the present invention and a standard GPS receiver.

A standard GPS receiver operates by receiving a Coarse Acquisition (C/A) Gold code which is repeated continuously, and transmitted from all GPS satellites as an L-Band signal. From this code, and knowledge of the location of the transmitting satellites, pseudoranges are extracted and progressively refined. Some receivers can utilize the more accurate "P" code or Pseudorandom Noise code which is of greater length, but the principle is the same. These pseudoranges are then utilized in a multilateration computation to locate the position of the receiver. Due to the directionality of the L-Band signal (which was designed for terrestrial navigation), its reception at geostationary orbit is insufficient for navigation use as shown in FIG. 1.

The receiver of the present invention utilizes the UHF satellite crosslink signal which is not intended for navigation use by receivers external to the GPS constellation. Beginning with the new Block IIR GPS satellites, these (GPS) satellites will utilize this link in an active mode, sending ranging signals in Time Division Multiple Access (TDMA) format to other GPS satellites. As this signal is available at geostationary orbit, this disclosure is concerned with a technique which utilizes these signals in a new navigation receiver architecture. The uniqueness of the approach in this disclosure is its basis on a TDMA signal which is infrequently updated (only once every 15 minutes per GPS satellite). Unlike the standard GPS receiver which can self acquire the L-Band signal, the High Orbit receiver requires an initialization before pseudoranges can be measured. This technique consists of a special initialization message which includes both a satellite almanac and timing reference. The reason why this low ranging update mechanization is feasible is due to an equivalent low dynamic environment for the satellites. Despite a high satellite velocity (in earth centered coordinates), the satellite's orbital elements are highly deterministic and this receiver mechanization does not require calculated accelerations. It is the fact that satellite forces are known with such precision that permits the use of the intermittent crosslink signal in this receiver concept.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

To fully understand the navigation technique and system of the present invention a brief description of the AUTONAV process in GPS block IIR is in order. Each of the GPS block IIR satellites has a Kalman filter for implementing its own Kalman procedure to autonomously navigate. The Kalman filter processes the GPS measurements and provides the best estimate of the satellite's navigation state. At periodic intervals, each block IIR satellite broadcasts its clock value, ephemerous data, and Kalman Filter data—collectively known as an "autonomous navigation message". This data is used by all receiving GPS satellites to update their own Kalman procedures. In order for the GPS satellites to broadcast and receive data among themselves they are equipped with transmitters and receivers dedicated to that purpose, collectively known as the satellite "crosslinks". All block IIR satellites that are in view of the broadcasting satellite's antenna will receive broadcasted data. A broadcast period is defined, and each satellite broadcasts during an assigned portion of that period. This method of data transmission is known as Time Division Multiple Access (TDMA). The identity of broadcasting satellite can be determined by any receiving satellite merely by noting the time of broadcast. The range between satellites is computed by noting the elapsed time between transmission by the broadcasting satellite and reception by the receiving satellite and then multiplying that time by the speed of propagation, nominally the speed of light. Currently, through crosslink communication, Block IIR satellites can maintain highly accurate determinations of their position relative to one another.

Figure 1:
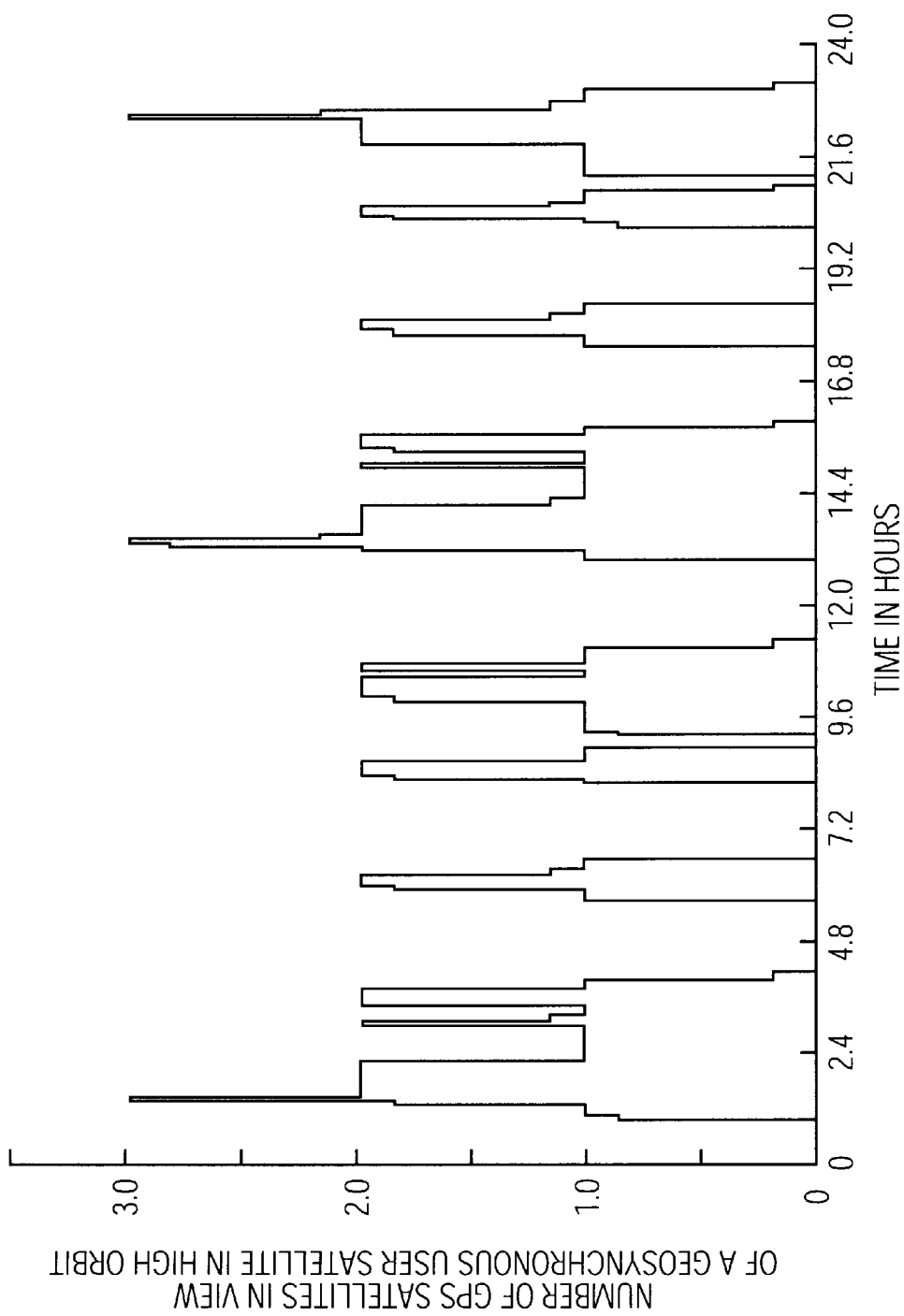
FIG. 1 is a graph which depicts the number of GPS satellites in view of a geosynchronous user satellite in high orbit at any given time using prior art navigation techniques.
Figure 2:
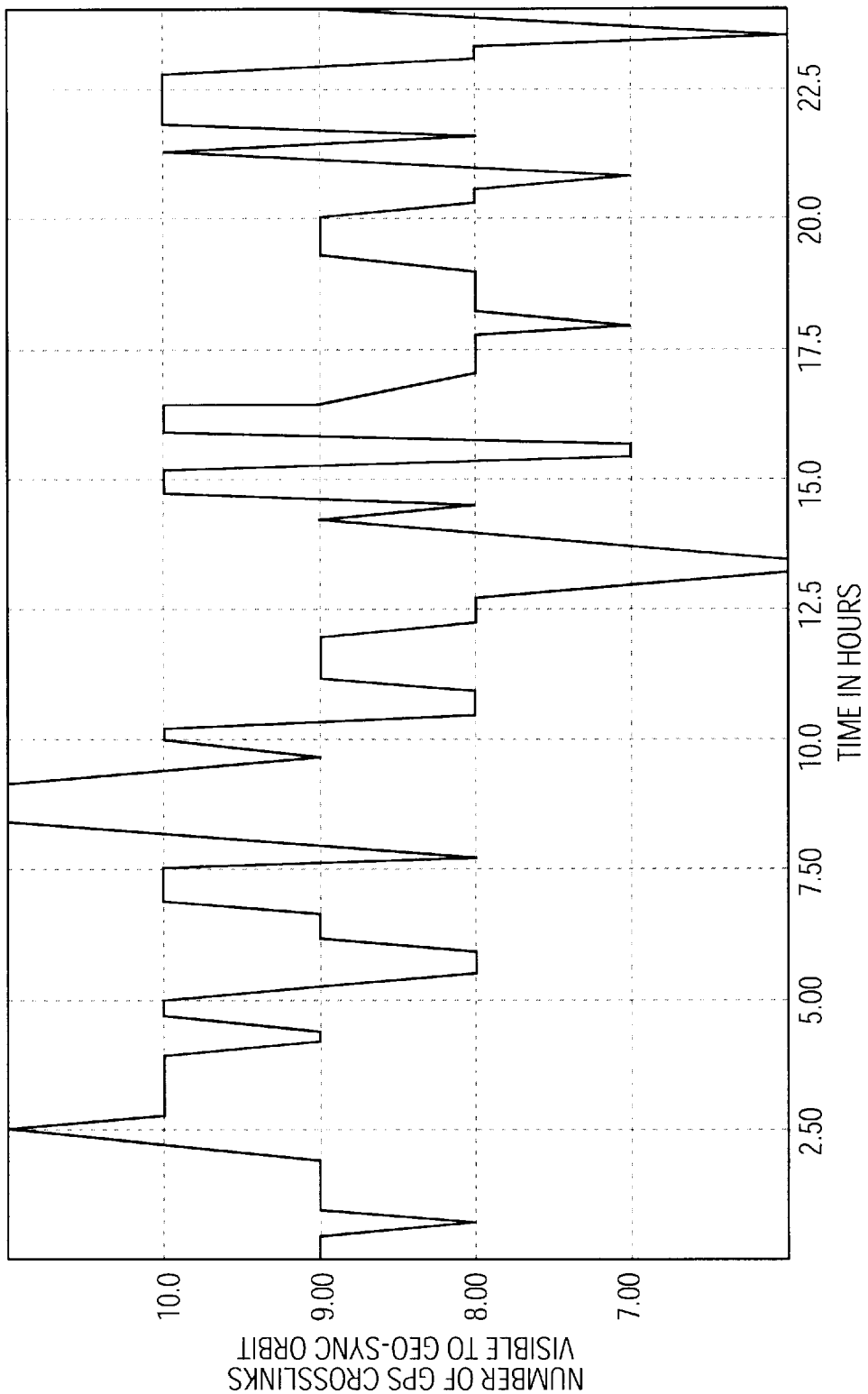
FIG. 2 is a graph which shows that typically eight to ten GPS satellites would be visible to satellites in geostationary orbit.
Figure 3:
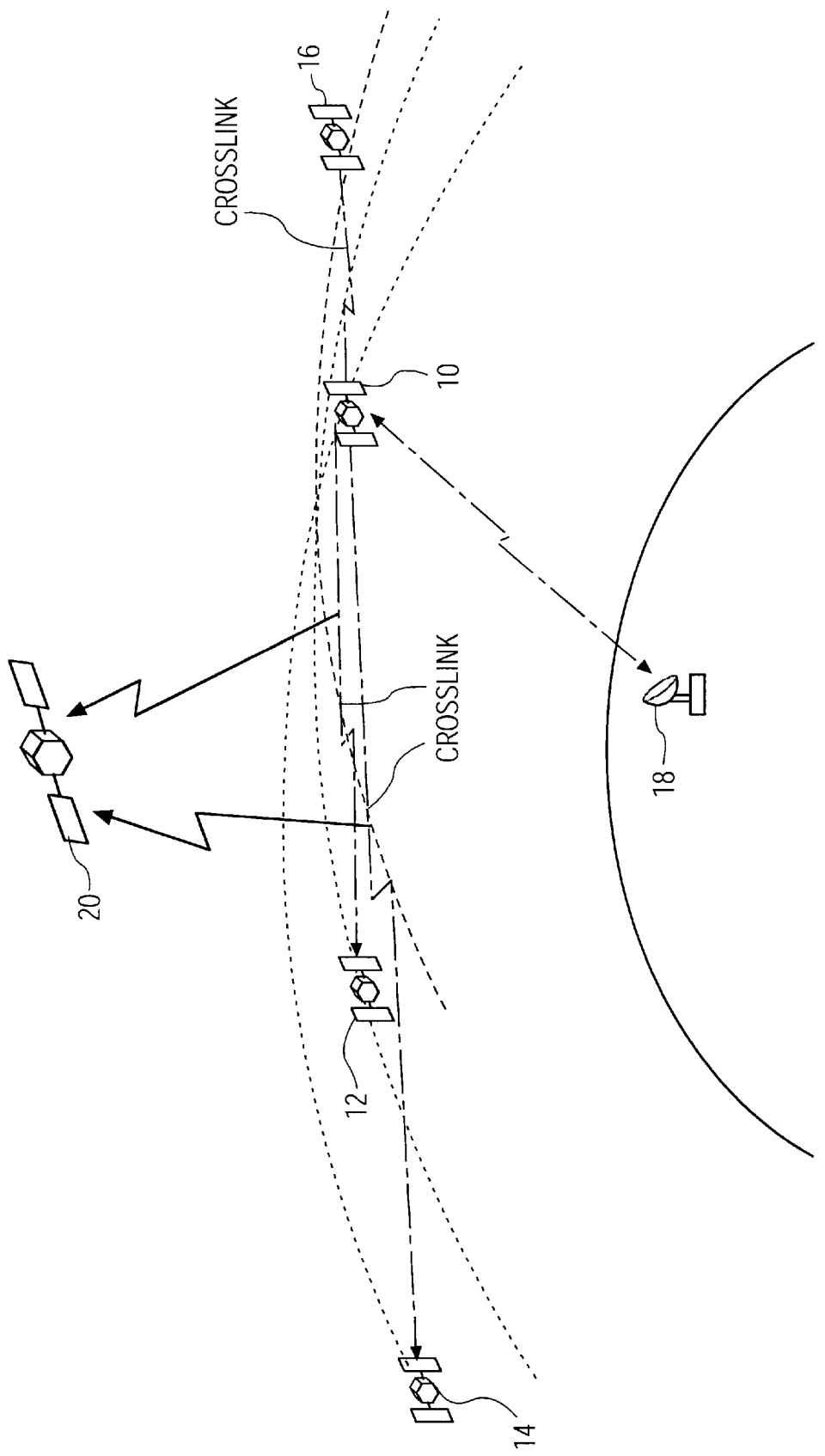
FIG. 3 is a plan view of a constellation of orbiting satellites showing the communication links between the satellites and a high orbit satellite employing the navigation system and method of the present invention.

The crosslink communication between GPS block IIR satellites is depicted in FIG. 3. As shown, a broadcasting GPS satellite 10 transmits its TDMA generated data to all receiving GPS satellites that are visible to the broadcasting satellite's antenna. The clock value, ephemerous data, and Kalman Filter data is transmitted as a UHF signal from the broadcasting satellite 10 to the receiving GPS satellites of this example, 12, 14, 16. The TDMA generated data, which contains a ranging message and a navigation message, is used by the receiving satellites 12, 14, 16 to update their clocks, ephemerous data, and Kalman Filter data. For a further discussion of crosslink communication between GPS block IIR satellites, see B. Parkinson et al *Global Positioning System: Theory and Application* Progress in Astronautics and Aeronautics, American Inst. of Aeronautics and Astronautics Vol. 163.

As noted above, each GPS block IIR satellite has an on-board Kalman Filter that the satellite uses to generate a solution for the satellite's position. As is well known in the art, a Kalman filter generates a satellite position determination from multiple sources that is more accurate than could be achieved by either source individually. One of the filter's sources provides updated predictions of the satellite's position as determined by a mathematical model of the satellite orbit. The second source provides updated satellite position data as communicated from the satellite's themselves, i.e., each satellite's position as computed by its internal tracking mechanism. After receiving information form the two sources, the Kalman Filter computes a new position determination based on a weighted average of the received information. In this manner the Kalman filter can operate to minimize the mean-squared error among the satellite position determinations. A further discussion of Kalman Filters can be had by referring to Harold W. Sorenson, editor *Kalman Filtering: Theory and Application* IEEE Press (1985).

Using the Kalman Filter in conjunction with periodic receptions of data from the other satellites, each satellite can maintain an accurate fix on this position relative to all other satellites. (The satellites also communicate with a ground control station 18 in order for the satellites to maintain a fix of their positions relative to the surface of the earth, as well as to update ephemerous prediction data.)

The present invention provides a passive, non-cooperative, navigation system which utilizes the TDMA generated UHF signals transmitted between the GPS block IIR satellites e.g., 10, 12, 14, 16 to permit a spacecraft such as a satellite 20 with various mission equipment in high orbit to "self locate" its position in the celestial sphere for orbit and mission payload control functions. In doing so, the navigation implementation recovers its orbital parameters and GPS time.

Figure 4:
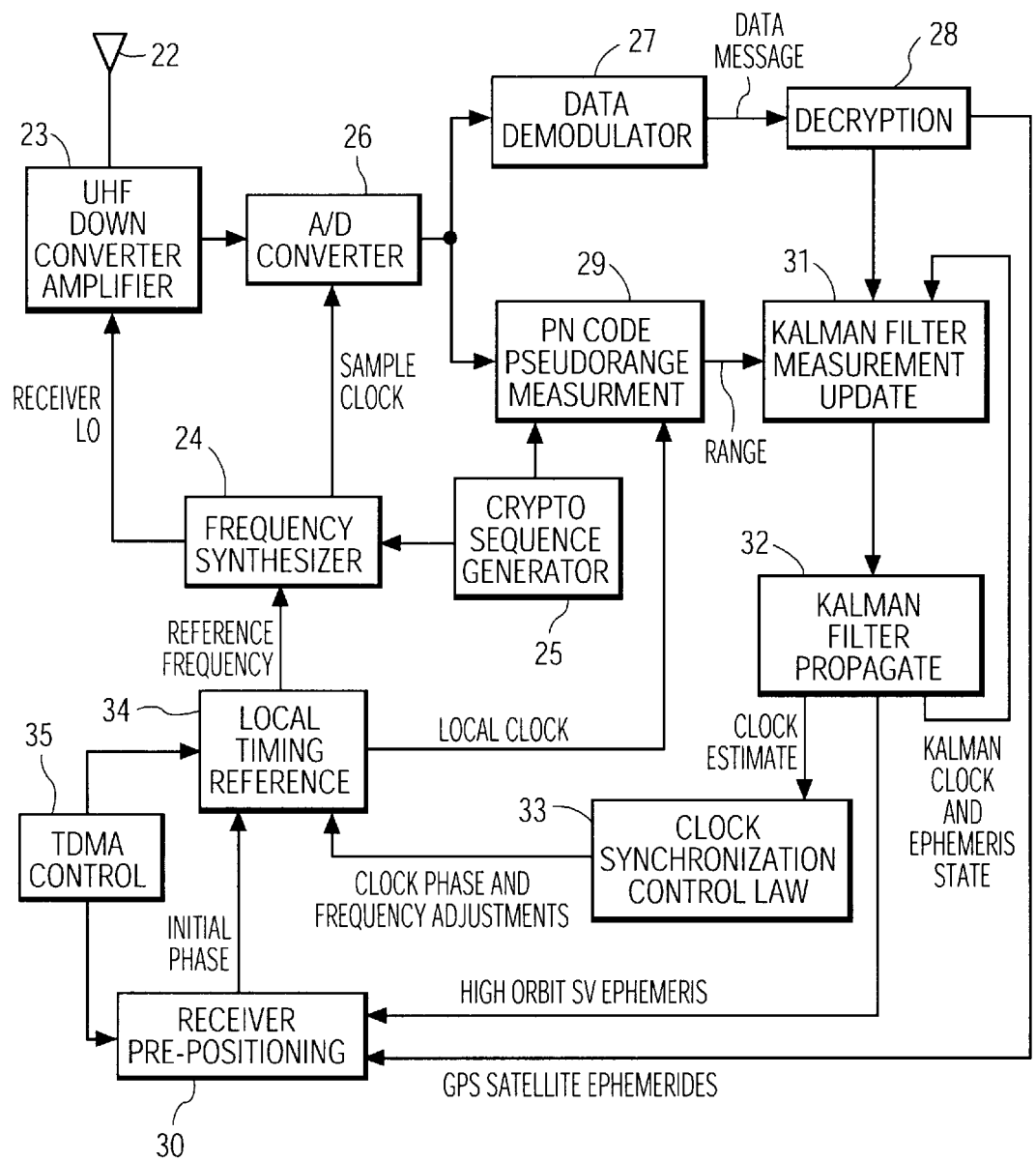
FIG. 4 is a block diagram depicting an exemplary system implementation of the present invention.

Referring now to FIG.4, a signal flow diagram depicting an exemplary implementation of the present invention is shown. The UHF transmissions from satellites in the GPS constellation are received by an antenna 22. These are down converted by a down converter amplifier 23 to an intermediate frequency (IF). Since, the signal is frequency hopping, the local oscillator for the down conversion, generated by a frequency synthesizer 24, must change frequency synchronously with the incoming signal. A crypto sequence generator 25 is required to determine the sequence of frequencies in the frequency hopping pattern. The IF is sampled by an a/d converter 26. The sampled data is processed by a central navigation processor which includes a memory for storing position data. The sampled data is processed in one of two modes depending on whether a data signal or a ranging signal is being received. When the a/d converter 26 is receiving a data signal, a data demodulator 27 performs a digital data demodulation of the frequency shift keyed (FSK) signal. Demodulation of FSK signals is well known in the art and is described for example, in Simon S. Haykin *Digital Communications* (1988). When the a/d converter 26 is receiving a ranging signal, a pseudorange measurement is performed as shown in box 29. The crypto sequence generator 25 is also used to generate the PN code.

Because the UHF crosslink messages broadcast by the GPS satellites are encrypted, they must be under go decryption at box 28 in order to use the navigation data. The navigation message contains the satellite ephemeris which is in the form of a 15 parameter augmented Keplerian representation as is well known in the art and described in B. Parkinson et al *Global Positioning System: Theory and Application* Progress in Astronautics and Aeronautics, American Inst. of Aeronautics and Astronautics Vol 163. The navigation message also contains clock offset at the time of transmission.

The pn code pseudorange measurement 29 is performed by correlating the samples to a locally generated pseudo-random noise (PN) sequence. The crypto sequence generator 25 is required to generate the PN sequence, this ranging technique described also in B. Parkinson et al *Global Positioning System: Theory and Application* Progress in Astronautics and Aeronautics, American Inst. of Aeronautics and Astronautics Vol 163. A key difference from typical GPS receivers is that in the present invention precise receiver prepositioning as depicted in box 30 is required. This is because the ranging transmission in a TDMA protocol is necessarily very short. The ranging transmission must begin and end in a single time slot.

The Kalman filter state consists of clock phase, clock frequency and six parameters that represent the orbit of the spacecraft. Several alternative parametric orbit representations exist but all are equivalent insofar as the satellite's position and velocity at a given time can be determined from six parameters and a time of epoch. Well known examples of orbit representations in six parameters are: 1) position and velocity vectors, 2) classical Keplarian orbital elements, 3) equinoctial elements. See for example, Richard H. Battin *An Introduction to the Mathematics and Methods of Astrodynamics* American Institute of Aeronautics and Astronautics (1987). It is possible to implement the filter with any of these methods but the classical orbital element approach will be describe here. Kalman filters which estimate orbits in this way have been described in the art in various publications such as M. Baylocq, G. Hannan, and A. Maldonado *Autonomous Spacecraft Navigation, Extended Kalman Filter Estimation of Classical Orbital Parameters* Amer. Inst. of Aeronautics and Astronautics, Guidance and Control Conference (1984), and M. Ananda et al *Autonomous Navigation of the GPS Satellites* Amer. Inst. of Aeronautics and Astronautics, Guidance and Control Conference (1984). The Kalman filter here differs from those described in these two references in that the phase and frequency of the clock must be included in the state vector.

Kalman filtering consist of two major well known processing steps. In the first step, commonly known as a Kalman filter measurement update 31, the pseudorange measurements are absorbed by the filter. In the second step, commonly known as a Kalman filter propagate 32, the Kalman filter state is propagated forward in time. For a detailed discussion about Kalman filtering see Harold W. Sorenson, editor *Kalman Filtering: Theory and Practice* IEEE Press (1985).

The clock states are used to synchronize the local timing reference to the GPS transmissions using a clock synchronization control law 33. This control law is a transformation which converts the estimated phase and frequency offsets to frequency correction commands, to a local timing reference 34 for the purpose of driving the offsets to zero.

The ephemeris estimates, in addition to their ultimate utility in tracking the satellite, are also used to preposition the receiver as depicted in box 30. As is well known in the art, receiver prepositioning is a process which involves setting the code phase of the local PN code generator as close as possible to the incoming signal so that the code search window is as small as possible (see again B. Parkinson et al *Global Positioning System: Theory and Application* Progress in Astronautics and Aeronautics, American Inst. of Aeronautics and Astronautics Vol 163). Prepositioning requires predicting the time of arrival of the signal by computing the signal propagation time from the GPS satellite to the high orbit satellite. The positions of the satellites are computed using the ephemeris for each satellite. The GPS ephemeris is initially uplinked to the satellite. After the process has started, updated ephemerides are obtained from the UHF crosslink messages. The high orbit satellite knows which satellite is transmitting by its time slot. TDMA control as depicted in box 35, keeps track of the GPS satellite time slots.

Figure 5:
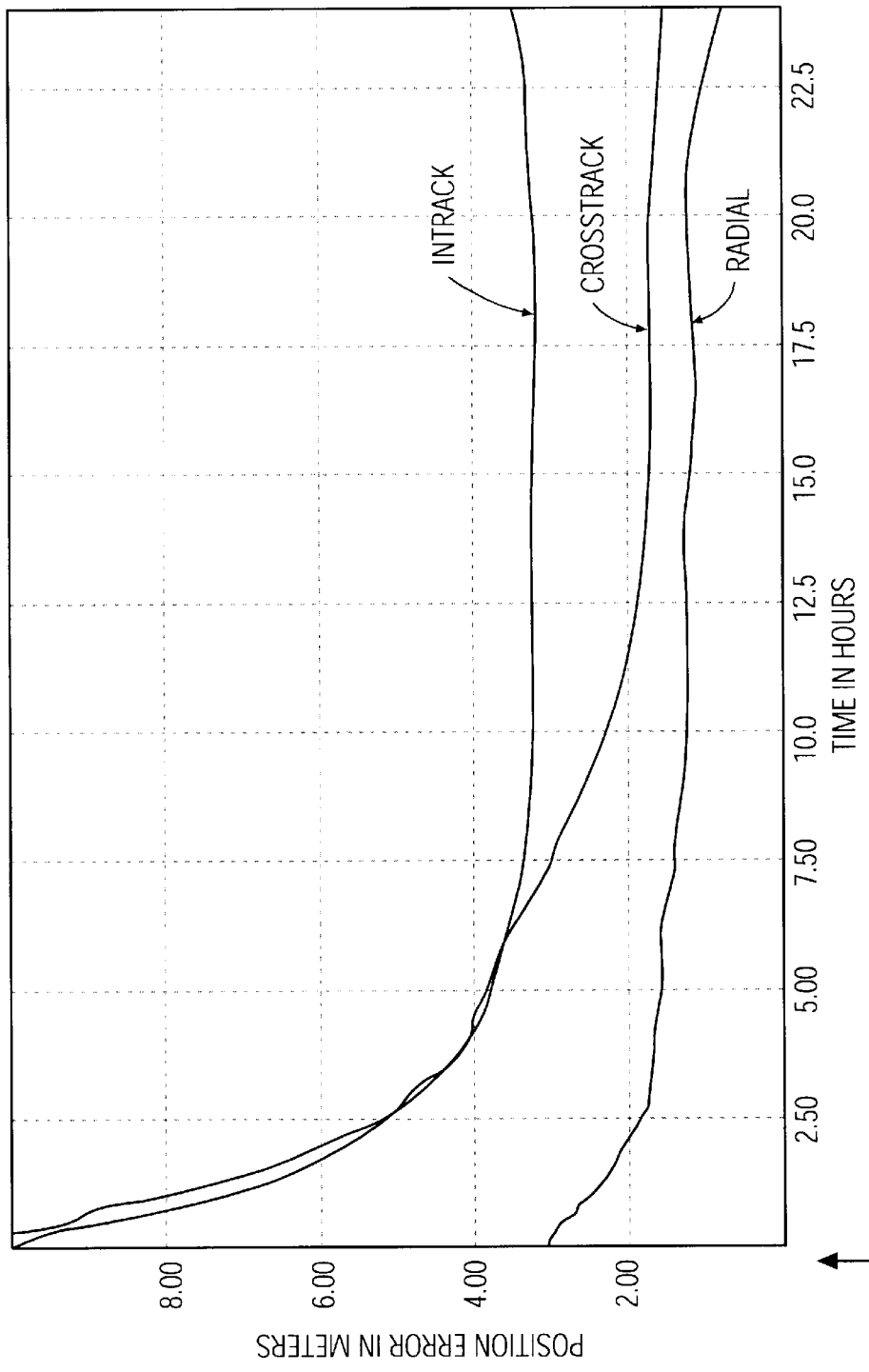
FIG. 5 depicts the navigation performance that can be expected from the present invention based upon a computer simulations.

In FIG. 5, the navigation performance that can be expected from the present invention is shown, based upon a computer simulations. As can be seen, these results typically settle out to be less than 4 meters, 1F.

As should now be apparent to one of ordinary skill in the art, there are several significant advantages to the use of the present invention. On significant advantages includes substantially eliminating the need for ground based tracking stations since, the high orbit satellite relies entirely on the GPS satellites to self locate its position in the celestial sphere. The navigation techniques of the present invention also provides for secure operation, as it is passive, autonomous, and anti-jam. The navigation technique of the present invention is also highly reliable and highly available because a large number of satellites are always visible. Furthermore, the present invention provides precision timing as well as navigation (reference to GPS time and UTC) thereby improving orbit determination accuracy by a factor of at least three over ground based tracking methods.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

What is claimed is:

1. A navigation system for a high orbit spacecraft, which passively utilizes UHF signals carrying intersatellite ranging data transmitted by a constellation of satellites that travel in lower orbits around the earth, said navigation system enabling the high orbit spacecraft to self locate its position relative to an earth centered coordinate frame, said navigation system comprising:

receiver means for receiving the UHF signals carrying the intersatellite ranging data; and optimum filter means coupled to said receiver means for processing said ranging data received by said receiver means and generating and updating spacecraft position data thereby enabling the high orbit spacecraft to self locate its position relative to the earth centered coordinate frame.

2. The navigation system according to claim 1, wherein the high orbit spacecraft includes mission equipment, said optimum filter means supplying the mission equipment with the position data for orbit and mission payload control functions.

3. The navigation system according to claim 1, wherein said optimum filter means comprises a Kalman filter.

4. The navigation system according to claim 1, wherein said optimum filter means includes central navigation processor means for processing the ranging data.

5. The navigation system according to claim 4, wherein said optimum filter means further includes timing reference means in communication with said central navigation processor means, for enabling the spacecraft to carry out position determination and other system tasks at precise time intervals.

6. The navigation system according to claim 5, wherein said optimum filter means further includes memory means in communication with said central navigation processor means, for storing said position data.

7. The navigation system according to claim 1, further comprising decryption control means in communication with said central navigation processor means, for deciphering the ranging data received from the satellites before the ranging data is processed by said central navigation processor means.

8. The navigation system according to claim 1, wherein said receiver means includes RF and IF stages for converting the UHF signals to intermediate signals having the ranging data.

9. The navigation system according to claim 8, further comprising an analog-to-digital converter for converting the intermediate signal from analog to digital.

10. The navigation system according to claim 9, further comprising a digital signal processing means for processing the digital ranging data signal into pseudorange measurements.

11. A method for enabling a high orbit spacecraft to self locate its position relative to an earth centered coordinate frame, said method comprising the steps of:

receiving UHF signals carrying intersatellite ranging data transmitted by a constellation of satellites that travel in orbits around the earth which are lower than the high orbit spacecraft; and processing said received ranging data to generate and update spacecraft position data thereby enabling the high orbit spacecraft to self locate its position relative to the earth centered coordinate frame.

12. The method according to claim 11, wherein the high orbit spacecraft includes mission equipment, and further comprising the step of supplying the mission equipment with the position data for orbit and mission payload control functions.

13. The method according to claim 11, wherein said step of processing is performed with Kalman filter means.

14. The method according to claim 13, wherein said Kalman filter means includes central navigation processor means for processing the ranging data.

15. The method according to claim 14, wherein said Kalman filter means further includes timing reference means in communication with said central navigation processor means, for enabling the spacecraft to carry out position determination and other system tasks at precise time intervals.

16. The method according to claim 15, wherein said Kalman filter means further includes memory means in communication with said central navigation processor means, for storing said position data.

17. The method according to claim 11, further comprising the step of deciphering the ranging data received from the satellites before said step of processing.

18. The method according to claim 11, wherein said step of receiving is performed with receiver means which includes RF and IF stages for converting the UHF signals to intermediate signals having the ranging data.

19. The method according to claim 18, further comprising the step of converting the intermediate signals from analog to digital.

20. The method according to claim 19, further comprising the step of digitally processing the digital ranging data signal into pseudorange measurements.

* * * * *